(12) United States Patent
Antoine

(10) Patent No.: US 7,035,408 B2
(45) Date of Patent: Apr. 25, 2006

(54) METHOD TO GENERATE PSEUDO-RANDOM SEQUENCE OF MULTI-CARRIER DATA SYMBOLS, AND RELATED TRANSMITTER AND RECEIVER

(75) Inventor: Philippe Antoine, Walhains (BE)

(73) Assignee: Alcatel, Paris (FR)

( * ) Notice: Subject to any disclaimer, the term of this patent is extended or adjusted under 35 U.S.C. 154(b) by 864 days.

(21) Appl. No.: 09/840,046

(22) Filed: Apr. 24, 2001

(65) Prior Publication Data

US 2001/0036274 A1    Nov. 1, 2001

(30) Foreign Application Priority Data

Apr. 26, 2000    (EP) .................. 00401154

(51) Int. Cl.
*H04L 9/00* (2006.01)
(52) U.S. Cl. ................ 380/47; 380/44; 380/46; 708/250
(58) Field of Classification Search .......... 380/46, 380/47, 44; 708/250
See application file for complete search history.

(56) References Cited

U.S. PATENT DOCUMENTS 5,054,067 A * 10/1991 Moroney et al. .......... 380/37
5,438,622 A * 8/1995 Normile et al. .......... 380/46
6,014,408 A * 1/2000 Naruse et al. .......... 375/130

FOREIGN PATENT DOCUMENTS

EP    0 443 752 A2    8/1991
EP    0 924 905 A2    6/1999

OTHER PUBLICATIONS

ADSL Standard Specification Network and Customer installation Interfaces—Asymmetric Digital Subscriber Line (ADSL) Metallic Interface, published by the American National Standard Institute (ANSI), 1998, referred to by ANSI T1E1.413 Issue 2.

* cited by examiner

*Primary Examiner*—Gilberto Barrón, Jr.
*Assistant Examiner*—Jung Kim
(74) *Attorney, Agent, or Firm*—Sughrue Mion, PLLC

(57) ABSTRACT

To generate a pseudo-random sequence (PRMS1) of multi-carrier data symbols (DMT0, DMT1, DMT2), a pseudo-random bit sequence (PRBS1) is produced by repetitively generating a pseudo-random sequence of L bits, L being a first integer value (L=4). To create a multi-carrier data symbol (DMT0, DMT1, DMT2) N bits are used, N being a second integer value (N=8). The pseudo-random bit sequence (PRBS1) is subdivided into strings of N' bits, N' being a third integer value larger than N (N'=9), and N bits out of each string of N' bits are used to generate a respective multi-carrier data symbol (DMT0, DMT1, DMT2). N'-N bits out of each string of N' bits are left unused.

9 Claims, 2 Drawing Sheets

METHOD TO GENERATE PSEUDO-RANDOM SEQUENCE OF MULTI-CARRIER DATA SYMBOLS, AND RELATED TRANSMITTER AND RECEIVER

BACKGROUND OF THE INVENTION

The present invention relates to a method to generate a pseudo-random sequence of multi-carrier data symbols by producing a pseudo-random bit sequence by repetitively generating a pseudo-random sequence of L bits, L being a first integer value and packetizing into multi-carrier data symbols thereby using N bits of the pseudo-random bit sequence per multi-carrier data symbol, N being a second integer number, to thereby generate the pseudo-random sequence of multi-carrier data symbols, a generator of a pseudo-random sequence of multi-carrier data symbols comprising scrambling means, adapted to repetitively generate a pseudo-random sequence of L bits, L being a first integer value, to thereby produce a pseudo-random bit sequence and packetizing means, adapted to packetize into multi-carrier data symbols using N bits of said pseudo-random bit sequence per multi-carrier data symbol, N being a second integer number, to thereby generate the pseudo-random sequence of multi-carrier data symbols, a multi-carrier transmitter including a pseudo-random sequence generator and transmitting means coupled to the pseudo-random sequence generator, and adapted to transmit a pseudo-random sequence of multi-carrier symbols generated by the pseudo-random sequence generator over a communication channel, and a multi-carrier receiver including a pseudo-random sequence generator and receiving means adapted to receive a first pseudo-random sequence of multi-carrier symbols transmitted over a communication channel, and decoding means, coupled to said receiving means and to the pseudo-random sequence generator, and adapted to decode the first pseudo-random sequence of multi-carrier symbols and a second pseudo-random sequence of multi-carrier symbols generated by the pseudo-random sequence generator.

Methods and equipment to generate a pseudo-random sequence of multi-carrier data symbols are already known in the art, e.g., from the *ADSL Standard Specification 'Network and Customer Installation Interfaces—Asymmetric Digital Subscriber Line (ADSL) Metallic Interface'*, published by the American National Standards Institute (ANSI) in 1998 and referred to by ANSI T1E1.413 Issue 2. According to this Standard Specification, the ADSL line termination at the central office generates a pseudo-random sequence of 16,384 DMT (Discrete Multi Tone) data symbols, each comprising 512 bits. The pseudo-random sequence of DMT data symbols, named C-MEDLEY in paragraph 9.6.6 of the just cited Standard Specification, is derived from a pseudo-random sequence of 511 bits generated repetitively by a scrambler in the ADSL line termination. The pseudo-random sequence of DMT data symbols, C-MEDLEY, is sent over a twisted pair telephone line towards the ADSL network termination at the customer premises and is used therein for downstream channel analysis. In a similar way, the ADSL network termination at the customer premises produces a pseudo-random sequence of 16,384 DMT data symbols each having a length of 64 bits, named R-MEDLEY in paragraph 9.7.8 of the above cited Standard Specification, and sends this pseudo-random sequence of DMT data symbols over the twisted pair telephone line towards the ADSL line termination at the central office for upstream channel analysis. The pseudo-random sequence of DMT data symbols, R-MEDLEY, is derived from a 63-bit long pseudo-random sequence of bits that is repetitively generated by a scrambler in the ADSL network termination.

In applications such as VDSL (Very High Speed Digital Subscriber Line), wherein the number of bits per multi-carrier data symbol, that will be named N throughout the remainder of this patent application, may have different values, two problems can occur in case the known technique is applied: the randomness of the sequence of multi-carrier data symbols may decrease significantly and/or the length of the pseudo-random sequence of multi-carrier data symbols may become short in comparison with the longest achievable pseudo-random sequence that contains L multi-carrier data symbols, L being the number of bits in the repetitively generated pseudo-random sequence of bits generated by the scrambler. Indeed, the length of the pseudo-random sequence of multi-carrier data symbols becomes short in case this number of bits per multi-carrier data symbol, N, relates in a certain way to the number of bits, L, in the pseudo-random sequence of bits that is repetitively generated by the scrambler, e.g., a.N=b.L with a and b being integer values respectively smaller than L and N. The number of bits in the repetitively generated pseudo-random sequence of bits, L, is typically equal to $2^S-1$ if the scrambler is implemented by a finite state machine and S represents the number of states of this finite state machine. Suppose, for instance, that S equals 9 and consequently that L equals $2^9-1=511$. If each multi-carrier data symbol has a length N of 1022 bits, then, because N=2.L, each multi-carrier data symbol in the pseudo-random sequence of multi-carrier data symbols will consist of exactly the same pseudo-random sequence of 1022 bits. In this situation, the length of the pseudo-random sequence is only 1 multi-carrier data symbols, which means that there is in fact no randomness. In case other relations are satisfied between N and L, e.g., N=L−1 or N=L+1, some randomness is lost. This is so because the bits in the pseudo-random sequence are typically used pairwise to apply random rotations to the different carriers. In the case of N=L−1 or N=L+1, the pair of bits that defines the random rotation that will be applied to a single carrier can only differ in one bit between two successive multi-carrier data symbols, thus reducing the randomness of the rotations that are applied. When applied in a VDSL system, the known method may thus generate a pseudo-random sequence of multi-carrier data symbols with decreased randomness or which is rather short whereas a long random sequence of multi-carrier data symbols is required in order to be able to analyze the channel—in ADSL channel analysis involves SNR (Signal to Noise Ratio) estimation—accurately.

SUMMARY OF THE INVENTION

An aspect of the present invention is to provide a method and equipment to generate a pseudo-random sequence of multi-carrier data symbols similar to the known one, but wherein irrespective of the relation between N, the number of bits per multi-carrier data symbol, and L, the number of bits in the repetitively generated pseudo-random sequence of bits where the pseudo-random sequence of multi-carrier data symbols is derived from, a high randomness is achieved.

According to the present invention, this aspect is realized in a method to generate a pseudo-random sequence of multi-carrier data symbols by producing a pseudo-random bit sequence by repetitively generating a pseudo-random sequence of L bits, L being a first integer value and packetizing into multi-carrier data symbols thereby using N bits of the pseudo-random bit sequence per multi-carrier data symbol, N being a second integer number, to thereby generate the pseudo-random sequence of multi-carrier data symbols, a generator of a pseudo-random sequence of multi-carrier data symbols-comprising scrambling means, adapted to repetitively generate a pseudo-random sequence of L bits, L being a first integer value, to thereby produce a pseudo-random bit sequence and packetizing means, adapted to packetize into multi-carrier data symbols using N bits of said pseudo-random bit sequence per multi-carrier data symbol, N being a second integer number, to thereby generate the pseudo-random sequence of multi-carrier data symbols, a multi-carrier transmitter including a pseudo-random sequence generator and transmitting means coupled to the pseudo-random sequence generator, and adapted to transmit a pseudo-random sequence of multi-carrier symbols generated by the pseudo-random sequence generator over a communication channel, and a multi-carrier receiver including a pseudo-random sequence generator and receiving means adapted to receive a first pseudo-random sequence of multi-carrier symbols transmitted over a communication channel, and decoding means, coupled to said receiving means and to the pseudo-random sequence generator, and adapted to decode the first pseudo-random sequence of multi-carrier symbols and a second pseudo-random sequence of multi-carrier symbols generated by the pseudo-random sequence generator.

Indeed, by subdividing the pseudo-random bit sequence at the output of the scrambler in strings of N' bits, N' being an integer larger than N, and by using only N bits out of each string of N' bits to constitute multi-carrier data symbols, a pseudo-random sequence of multi-carrier data symbols with higher randomness is generated. If, for instance, in the above described system with L=511 and N=1022, strings with a length of N'=1024 bits would be created, whereof only the first 1022 bits would be used in a multi-carrier symbol whilst the remaining bit would be left unused, a random sequence with the maximum possible length of 511 multi-carrier data symbols would be generated.

An alternative solution for the problem of decreased randomness in case N and L relate to each other in certain ways, is to increase L, the number of bits in the repetitively generated pseudo-random data sequence of bits. If L, however, is chosen high, the scrambler is not optimized in terms of PAR (Peak to Average Ratio) so that this solution is not preferred in multi-carrier transmission systems wherein PAR reduction is a major concern.

It is to be noticed that the term 'comprising' should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled' should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

An additional, optional feature of the multi-carrier transmitter are selection means, adapted to select a third integer value N', and communication means coupled to the selection means, and adapted to communicate the third integer value N' to a multi-carrier receiver.

Thus, in case the length N' of the bit strings is not predefined as a function of L and N (one can imagine that a predefined table known by at the transmitter and receiver sides could associate a value N' with each pair of values N and L), the length N' of the bit strings may be selected in the multi-carrier transmitter wherein the pseudo-random sequence of multi-carrier data symbols is generated. Because the value N' also has to be known at the receiver side in order to be able to generate the same pseudo-random sequence of multi-carrier data symbols there and to perform the channel analysis, the value N' selected by the transmitter has to be communicated to the receiver. A standard specified field or message may be used. It is evident that the value N' alternatively may be selected in the receiver and may be communicated from the receiver to the transmitter. More specifically, in the preferred embodiment, the value N' is calculated at the line termination or central office side because the spectral plan is known there and N is known there (N is derived from the spectral plan and typically equals twice the number of carriers, either downstream carriers or upstream carriers). This means that the value N' is determined at the transmitter side for the downstream direction and at the receiver side for the upstream direction, and obviously may have different values for the downstream and upstream directions.

Another optional feature of the multi-carrier transmitter is the selection means is adapted to select said third integer value N' so that N' differs from L−1, so that N' differs from L+1, and so that N' is not fractionally related to L.

By selecting N' so that N' differs from L−1 and from L+1, a high randomness between successive multi-carrier data symbols is achieved. Moreover, by selecting N' so that it is not fractionally related to L, a long random sequence of multi-carrier data symbols is obtained.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
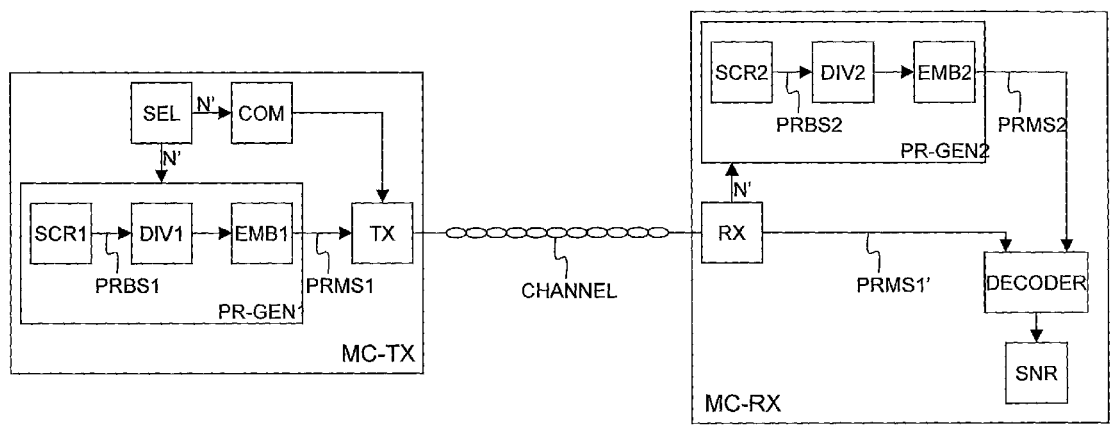
FIG. 1 is a functional block scheme of a VDSL (Very High Speed Digital Subscriber Line) system including an embodiment of the multi-carrier transmitter MC-TX according to the present invention and a first embodiment of the multi-carrier receiver MC-RX according to the present invention.

The VDSL (Very High Speed Digital Subscriber Line) system drawn in FIG. 1 is comprised of two VDSL transceivers communicating with each other via a twisted pair telephone line CHANNEL. The VDSL transceiver located at the central office contains a transmitting part and a receiving part whereof only the transmitting part MC-TX is drawn; This VDSL transmitter MC-TX includes transmitting circuitry TX, a first pseudo-random sequence generator PR-GEN1, a selector SEL and communicating circuitry COM.

The first pseudo-random sequence generator PR-GEN1 contains the cascade connection of a first scrambler SCR1, a first divider DIV1, and a first embedder EMB1 and is coupled via its output terminal to an input terminal of the transmitting circuitry TX. The selector SEL has a first output terminal coupled to a control input of the first pseudo-random sequence generator PR-GEN1, and a second output terminal coupled to an input terminal of the communicating circuitry COM. An output terminal of the just mentioned communicating circuitry COM is coupled to an input terminal of the transmitting circuitry TX. The VDSL transceiver located at the customer premises also contains a transmitting part and a receiving part whereof only the receiving part MC-RX is drawn in FIG. 1. This VDSL receiver MC-RX contains a second pseudo-random sequence generator PR-GEN2, receiving circuitry RX, a decoder DECODER, and a signal to noise ratio estimating unit SNR. An output terminal of the receiving circuitry RX is coupled to a first input terminal of the decoder DECODER. The receiving circuitry RX further has a second output terminal coupled to a control terminal of the second pseudo-random sequence generator PR-GEN2. This second pseudo-random sequence generator PR-GEN2 includes the cascade connection of a second scrambler SCR2, a second divider DIV2, and a second embedder EMB2, and its output terminal is coupled to a second input terminal of the decoder DECODER. An output terminal of the decoder DECODER is connected to an input terminal of the signal to noise ratio estimating unit SNR.

To transfer digital data over the telephone line CHANNEL, the VDSL transceiver at the central office and the one at the customer premises constitute DMT (Discrete Multi Tone) symbols. The VDSL transceivers thereto modulate the digital data on a set of carriers in accordance with a certain bit allocation scheme that is known at the central office and at the customer premises. The bit allocation scheme specifies which carriers are used, how many bits are modulated on each used carrier, and which modulation technique (4QAM, 8QAM, . . . ) is used to modulate the bits on the carriers. This bit allocation scheme is made up after channel analysis, a procedure executed at initialization of the VDSL system wherein the signal to noise ratio (SNR) for transfer of the different carriers from the central office to the customer premises or vice versa is estimated on the basis of a pseudo-random sequence of multi-carrier data symbols that is sent over the line CHANNEL and analyzed upon receipt. In the following paragraphs it is described in detail how this pseudo-random sequence of multi-carrier data symbols is generated in the embodiment of the present invention illustrated by FIG. 1 and FIG. 2.

Figure 2:
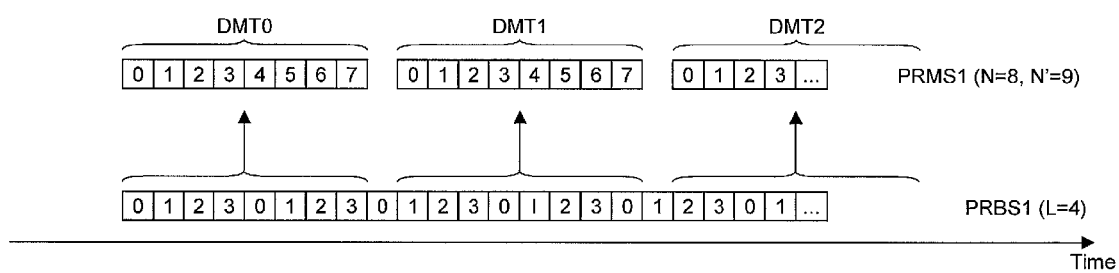
FIG. 2 is a time diagram illustrating the subdivision of the pseudo-random bit sequence PRBS1 generated by the scrambler SCR1 in the multi-carrier transmitter MC-TX of FIG. 1 into 9 bit long strings and the generation of 8 bit long multi-carrier data symbols DMT0, DMT1, DMT2 from these bit strings.

The first scrambler SCR1 repetitively generates a pseudo-random sequence of 4 bits, marked 0, 1, 2 and 3 in FIG. 2. The repetitively generated pseudo-random sequence of 4 bits constitutes a first pseudo-random bit sequence PRBS1 at the output of the first scrambler SCR1. This first pseudo-random bit sequence PRBS1 has to be encapsulated in multi-carrier data symbols wherein 8 bits can be embedded to constitute a first pseudo-random sequence of multi-carrier data symbols PRMS1. These multi-carrier data symbols are referred to by DMT0, DMT1 and DMT2 in FIG. 2. Because the length N (8 bits) of the multi-carrier data symbols DMT0, DMT1 and DMT2 is twice the length L (4 bits) of the pseudo-random sequence of bits that is repetitively generated by the first scrambler SCR1, each multi-carrier data symbol would contain exactly the same pseudo-random sequence of 8 bits if the first pseudo-random bit sequence PRBS1 would be encapsulated straightforwardly into the multi-carrier data symbols DMT0, DMT1 and DMT2. As a consequence, the randomness of the first pseudo-random sequence of multi-carrier data symbols PRMS1 would be inexistent. For this reason, the first divider DIV1 divides the first pseudo-random bit sequence PRBS1 into strings of $N'=9$ bits. Only the first 8 bits of each string of 9 bits are embedded into a multi-carrier data symbol by the first embedder EMB1, whereas the ninth bit of each string at the output of the first divider DIV1 is not used by the first embedder EMB1. The division of the first pseudo-random bit sequence PRBS1 into strings of 9 bits and the embedding into the multi-carrier data symbols DMT0, DMT1 and DMT2 is illustrated by FIG. 2. In this way, the first embedder EMB1 generates at its output the first pseudo-random sequence of multi-carrier data symbols PRMS1, that is transmitted by the transmitting circuitry TX over the telephone line CHANNEL to the VDSL receiver MC-RX at the customer premises. The length N' of the strings created by the first divider DIV1, is chosen by the selector SEL and provided as a control signal to the first divider DIV1 in the first pseudo-random sequence generator PR-GEN1. In addition the selector SEL supplies the value $N'=9$ to the communicating circuitry COM which communicates this value N' via the transmitting circuitry TX to the VDSL receiver MC-RX at the customer premises. To communicate the value N', this value may be embedded in a thereto standardized field or message of the initialization protocol.

Upon receipt of the value $N'=9$ at the VDSL receiver MC-RX, the receiving circuitry RX supplies this value N' to the second divider DIV2 in the second pseudo-random sequence generator PR-GEN2. With this value N', the second pseudo-random sequence generator PR-GEN2, i.e., the second scrambler SCR2, the second divider DIV2 and the second embedder EMB2, can generate a second pseudo-random sequence of multi-carrier data symbols PRMS2 that is a copy of the first pseudo-random sequence of multi-carrier data symbols PRMS1. The second scrambler SCR2 thereto generates a second pseudo-random bit sequence PRBS2 that is a copy of the first pseudo-random bit sequence PRBS1. This is possible because the repetitively generated pseudo-random sequence of 4 bits, 0, 1, 2 and 3, that constitutes the first as well as the second pseudo-random bit sequence is predefined. The second divider DIV2 divides the second pseudo-random bit sequence PRBS2 into strings of $N'=9$ bits and the second embedder EMB2 encapsulates the first eight bits of each string at the output of the second divider DIV2 into a multi-carrier data symbol and leaves the ninth bit in each multi-carrier data symbol unused.

The multi-carrier data symbols DMT0, DMT1 and DMT2 of the first pseudo-random sequence of multi-carrier data symbols PRMS1, after transfer over the telephone line CHANNEL and receipt by the receiving circuitry RX (the signal at the output of the receiving circuitry is marked PRMS1' in FIG. 1 because it may differ from the first pseudo-random bit sequence PRBS1 e.g., as a result of noise/interference on the line CHANNEL) are supplied to the decoder DECODER, e.g., a Discrete Multi Tone decoder in case the multi-carrier data symbols are DMT symbols. Also, the second pseudo-random sequence of multi-carrier data symbols PRMS2, locally generated, is supplied to the decoder DECODER. After being decoded, the contents of the multi-carrier data symbols in the pseudo-random sequence of multi-carrier data symbols PRMS1' can be compared with the contents of the multi-carrier data symbols in the second peudo-random sequence of multi-carrier data symbols PRMS2, so that the signal to noise ratio of the communication channel between the central office and the customer premises can be estimated. This is done by the signal to noise ratio estimating unit SNR.

A second embodiment of the present invention, not illustrated by any of the Figures, differs from the above described first embodiment in that the bits of the pseudo-random bit sequence are not embedded or encapsulated in multi-carrier data symbols but are used to apply a random rotation to the carriers constituting the multi-carrier data symbols. In this second embodiment, a scrambler again generates a pseudo-random bit sequence which is divided into strings of length N' by a divider. Only N bits out of each string are used to randomize the phase of the carriers, whereas N'-N bits out of each string are left unused. The bits, for example, may be used in pairs to randomly rotate the phase of the carriers. If the first two bits in a string of N' bits are 00, the phase of the first carrier for instance is left unrotated, if the first two bits are 01, the phase of the first carrier is rotated over 90 degrees, if the first two bits are 11, the phase of the first carrier is rotated over 180 degrees, and if the first two bits are 10 the phase of the first carrier is rotated over 270 degrees. In a similar way, the next two bits in this string of N' bits determine the rotation that will be applied to the second carrier, and so on. The phase rotation may be applied by an encoder coupled to the divider. At the receiver, a decoder will de-randomize the phase of the carriers. In this second embodiment, wherein the bits are used two by two to rotate the phase of the carriers, N' is chosen to differ from L−1 and L+1 because otherwise, a decreased randomness would be experienced. N' further is also chosen not to be fractionally related to L, i.e. $a.N' \neq b.L$ with a and b integer values that are respectively smaller than L and N', because such a choice of N' would significantly reduce the length of the random sequence of multi-carrier data symbols that could be generated.

Although the example of DMT (Discrete Multi Tone) multi-carrier communication has been given above, applicability of the present invention is not restricted to any particular multi-carrier linecode. Also in Zipper-based multi-carrier systems, in OFDM (Orthogonal Frequency Division Multiplexing) based multi-carrier systems, or in other multi-carrier systems, the pseudo-random sequence used for channel analysis may be generated according to the present invention.

The applicability of the present invention is not limited to a particular channel analysis technique. Although the example of SNR (Signal to Noise Ratio) estimation is given above, other parameters indicative for the loop quality could be sensed or estimated on the basis of a pseudo-random sequence generated according to the present invention.

The length L=4 bits of the repetitively generated pseudo-random sequence of bits, the length N=8 bits of the multi-carrier data symbols, and the length N'=9 bits of the strings were only given as an example. More realistic values for a VDSL (Very High Speed Digital Subscriber Line) system for instance would be L=2047 bits, N=2048 bits and N'=2050 bits, but again the present invention is not restricted to any particular values or range of values of these parameters.

Whereas implementations of the present invention have been described above for the downstream direction, i.e., the direction from the central office to the customer premises, of a VDSL (Very High Speed Digital Subscriber Line) system, the invention evidently can also be implemented in the upstream direction to improve upstream channel analysis accuracy. Moreover, a person skilled in the art will appreciate that the current invention can be implemented in uni-directional as well as bi-directional systems.

As already indicated in the introductory part of this patent application, a value N' may be associated with each pair of N and L values through a standardized table known at the transmitter and receiver side so that no selector circuitry is required and no message or field has to be reserved in the initialization protocol for communicating the value N'. An adequate value N', resulting in a satisfactory accuracy of the SNR estimation, may alternatively be found on a trial and error basis, e.g., by repetitively increasing the value N' by 1, starting from N.

Furthermore, the application of the present invention is not only attractive in situations wherein N=2L and wherein all multi-carrier data symbols would carry exactly the same pseudo-random sequence of bits if the pseudo-random sequence of bits would not be divided in strings and part of the strings would not be left unused. Whenever N and L relate to each other so that the randomness decreases significantly, e.g. if $L=N\pm1$ or $a.N=b.L$ with a and b being integer numbers respectively smaller than L and N, an appropriate value for N' may be selected and used to create pseudo-random strings that are not fully encapsulated in multi-carrier data symbols. The criteria under which the present invention is applied may be service dependent.

Although reference was made above to VDSL (Very High Speed Digital Subscriber Line) technology used for transmission over twisted pair telephone lines, any skilled person will appreciate that the present invention also can be applied in other DSL (Digital Subscriber Line) systems such as ADSL (Asynchronous Digital Subscriber Line), SDSL (Synchronous Digital Subscriber Line) systems, HDSL (High Speed Digital Subscriber Line) systems, and the like or in a cable based, a fibre based or a radio based communication systems, provided that a multi-carrier linecode is used for transmission of data thereover.

Furthermore, an embodiment of the present invention is described above rather in terms of functional blocks. From the functional description of these blocks, it will be obvious for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the claims.

The invention claimed is:

1. A method to generate a pseudo-random sequence of multi-carrier data symbols, said method comprising:
   producing a pseudo-random bit sequence by repetitively generating a pseudo-random sequence of L bits, L being a first integer value;
   packetizing into multi-carrier data symbols thereby using N bits of said pseudo-random bit sequence per multi-carrier data symbol, N being a second integer number, to thereby generate said pseudo-random sequence of multi-carrier data symbols,
   wherein said packetizing comprises:
      dividing said pseudo-random bit sequence into strings of N' bits, N' being a third integer value larger than N, wherein N is greater than or equal to two, N' differs from L−1 and from L+1, and N' is not fractionally related to L; and
      using N bits out of each string of N' bits to generate a multi-carrier data symbol out of said pseudo-random sequence of multi-carrier data symbols, and leaving N'-N bits out of each string of N' bits unused.

2. A generator of a pseudo-random sequence of multi-carrier data symbols, said generator comprising:
  scrambling means, adapted to repetitively generate a pseudo-random sequence of L bits, L being a first integer value, to thereby produce a pseudo-random bit sequence;
  packetizing means, adapted to packetize into multi-carrier data symbols using N bits of said pseudo-random bit sequence per multi-carrier data symbol, N being a second integer number, to thereby generate said pseudo-random sequence of multi-carrier data symbols,
  wherein said packetizing means comprises:
    dividing means, adapted to divide said pseudo-random bit sequence into strings of N' bits, N' being a third integer value larger than N, wherein N is greater than or equal to two;
    multi-carrier data symbol generating means, adapted to use N bits out of each string of N' bits to generate a multi-carrier data symbol out of said pseudo-random sequence of multi-carrier data symbols and to leave N'-N bits out of each string of N' bits unused; and
    selection means, adapted to select said third integer value N', wherein N' differs from L-1 and from L+1, and N' is not fractionally related to L.

3. The pseudo-random sequence generator according to claim 2, further comprising transmitting means, coupled to said pseudo-random sequence generator, and adapted to transmit a pseudo-random sequence of multi-carrier symbols generated by said pseudo-random sequence generator over a communication channel.

4. The pseudo-random sequence generator according to claim 3, further comprising communication means coupled to said selection means, and adapted to communicate said third integer value N' to a multi-carrier receiver.

5. The pseudo-random sequence generator according to claim 2, further comprising:
  receiving means adapted to receive a first pseudo-random sequence of multi-carrier symbols transmitted over a communication channel, and
  decoding means, coupled to said receiving means and to said pseudo-random sequence generator, and adapted to decode said first pseudo-random sequence of multi-carrier symbols and a second pseudo-random sequence of multi-carrier symbols generated by said pseudo-random sequence generator.

6. A generator of a pseudo-random sequence of multi-carrier data symbols, said generator, comprising:
  a scrambler that repetitively generates a pseudo-random sequence of L bits, L being a first integer value, to thereby produce a pseudo-random bit sequence;
  a packet generator that packetizes multi-carrier data symbols using N bits of said pseudo-random bit sequence per multi-carrier data symbol, N being a second integer number, to thereby generate said pseudo-random sequence of multi-carrier data symbols,
  wherein said packet generator comprises:
    a divider that divides said pseudo-random bit sequence into strings of N' bits, N' being a third integer value larger than N, and wherein, wherein N is greater than or equal to two; and
    a multi-carrier data symbol generator that uses N bits out of each string of N' bits to generate a multi-carrier data symbol out of said pseudo-random sequence of multi-carrier data symbols and to leave N'-N bits out of each string of N' bits unused; and
    a switch that selects said third integer value N', wherein N' differs from L-1 and differs from L+1, and N' is not fractionally related to L.

7. The pseudo-random sequence generator according to claim 6, further comprising a transmitter, coupled to said pseudo-random sequence generator, and adapted to transmit a pseudo-random sequence of multi-carrier symbols generated by said pseudo-random sequence generator over a communication channel.

8. The pseudo-random sequence generator according to claim 7, further comprising a communication device coupled to said switch, and adapted to communicate said third integer value N' to a multi-carrier receiver.

9. The pseudo-random sequence generator according to claim 6, further comprising:
  a receiver that receives a first pseudo-random sequence of multi-carrier symbols transmitted over a communication channel, and
  a decoder coupled to said receiving means and to said pseudo-random sequence generator, and decoding said first pseudo-random sequence of multi-carrier symbols and a second pseudo-random sequence of multi-carrier symbols generated by said pseudo-random sequence generator.

* * * * *